(12) United States Patent
Aira et al.

(10) Patent No.: US 7,748,908 B2
(45) Date of Patent: Jul. 6, 2010

(54) BEARING DEVICE

(75) Inventors: Tatsuo Aira, Hirakata (JP); Shuhei Takahashi, Hirakata (JP)

(73) Assignee: Komatsu Ltd., Tokyo (JP)

( * ) Notice: Subject to any disclaimer, the term of this patent is extended or adjusted under 35 U.S.C. 154(b) by 456 days.

(21) Appl. No.: 11/794,914

(22) PCT Filed: Jan. 20, 2006

(86) PCT No.: PCT/JP2006/000810

§ 371 (c)(1),
(2), (4) Date: Jul. 9, 2008

(87) PCT Pub. No.: WO2006/080242

PCT Pub. Date: Aug. 3, 2006

(65) Prior Publication Data
US 2008/0138005 A1    Jun. 12, 2008

(30) Foreign Application Priority Data
Jan. 25, 2005    (JP) .............................. 2005-016897

(51) Int. Cl.
*F16C 33/10* (2006.01)
*F16C 33/74* (2006.01)

(52) U.S. Cl. .......................... 384/385; 384/389; 384/130

(58) Field of Classification Search ................ 384/100, 384/130, 322, 381, 385, 389; 305/100, 105, 305/185, 194, 203
See application file for complete search history.

(56) References Cited

U.S. PATENT DOCUMENTS

| | | | | |
|---|---|---|---|---|
| 2,614,006 A | * | 10/1952 | Bechman | 384/381 |
| 3,099,166 A | * | 7/1963 | Schou | 74/359 |
| 3,473,644 A | * | 10/1969 | Hagerborg | 384/389 |
| 3,492,054 A | * | 1/1970 | Boggs et al. | 305/103 |
| 3,834,503 A | * | 9/1974 | Maurer et al. | 192/113.35 |
| 3,863,746 A | * | 2/1975 | Schulz | 192/106 F |
| 5,183,318 A | * | 2/1993 | Taft et al. | 305/185 |
| 5,211,484 A | * | 5/1993 | Quaglia | 384/322 |
| 5,829,850 A | * | 11/1998 | Ketting et al. | 305/194 |
| 6,206,491 B1 | * | 3/2001 | Hisamatsu | 305/103 |
| 6,386,651 B1 | * | 5/2002 | Gerardin et al. | 305/100 |
| 7,604,304 B2 | * | 10/2009 | Takayama | 305/203 |

FOREIGN PATENT DOCUMENTS

| | | |
|---|---|---|
| JP | 02-117420 U | 9/1990 |
| JP | 04-124321 U | 11/1992 |
| JP | 09-158940 A | 6/1997 |
| JP | 11-037138 A | 2/1999 |
| JP | 2001-349322 A | 12/2001 |

* cited by examiner

*Primary Examiner*—Marcus Charles
(74) *Attorney, Agent, or Firm*—Global IP Counselors

(57) ABSTRACT

A bearing device for uniformly distributing lubricating oil between first and second bushing sliding surfaces and a connection pin is provided. The connection pin is inserted into the first bushing that is inserted into a boss member. The second bushings are inserted into a pair of bracket members. An oil storage portion is formed at a middle part of the connection pin, and is communicated to an oil feed channel that feeds lubricating oil from the outside. First sealing members and second sealing members are disposed in the first bushing and the second bushings, respectively. A pair of first channels and a second channel are formed inside the connection pin. The first channels are opened in locations in proximity to the first sealing members. The second channel is communicated to this first channel and the oil storage chamber.

15 Claims, 4 Drawing Sheets

BEARING DEVICE

CROSS-REFERENCE TO RELATED APPLICATIONS

This U.S. National stage application claims priority under 35 U.S.C. §119(a) to Japanese Patent Application No. 2005-016897, filed in Japan on Jan. 25, 2005, the entire contents of which are hereby incorporated herein by reference.

TECHNICAL FIELD

The present invention relates to a bearing device that has pin connection, and particularly to a bearing device that is used in a working apparatus that is installed to a construction machine such as a hydraulic tractor shovel and a crane.

BACKGROUND ART

Generally, bearing devices that are used for a hydraulic tractor shovel, and so on has a structure in which a boss member is disposed between a pair of left and right bracket members, and a connection pin is inserted into bushings that are fitted into the pair of bracket members and the boss member. Thus, the connection pin can rotatably connect the boss member to the bracket members.

In the case of a hydraulic tractor shovel, for example, this type of bearing device that is conventionally used is disposed in each of connection portions of a boom, an arm, a bucket and so on that compose a working apparatus. For example, in the connection portion between the arm and the bucket, a connection pin rotatably connects bracket members that are disposed in the bucket to a boss member that is disposed at the fore end of the arm.

Lubricating oil such as grease is provided between the sliding surfaces of the bushings that are fitted into the boss member and the pair of bracket members, and the connection pin to allow the boss member and the pair of bracket members to smoothly rotate. In this type of bearing device, in order to prevent a connection pin from detaching from bushings, a bearing device which includes retaining stopper plates that are arranged at the ends of a pair of bracket members has been proposed (see Japanese Patent Laid-Open Publication TOKUKAI No. HEI 11-37138).

FIG. 5 is a cross-sectional view showing a bearing device that is disclosed in Japanese Patent Laid-Open Publication TOKUKAI No. HEI 11-37138. A pair of left and right bracket members 54 protrude outward from a bucket of a hydraulic tractor shovel (not shown). An arm boss 52 is arranged between the pair of brackets 54. A first bushing 55 is fitted in a bushing fit opening 52A of the arm boss 52. A sliding surface 55A that is in slidable contact with a connection pin 59 is formed on the inner peripheral surface of the first bushing 55. Sealing members 56 are attached between the arm boss 52 and the connection pin 59. Thus, the aforementioned sliding surface 55A is sealed by the sealing members 56.

Second bushings 57 are fitted in bushing fit openings 54A of the aforementioned pair of bracket members 54. Sliding surfaces 57A that are in slidable contact with the connection pin 59 are formed on the inner peripheral surfaces of the second bushings 57. Sealing members 58 are attached between the bracket members 54 and the connection pin 59. Thus, the aforementioned sliding surfaces 57A are sealed by the sealing members 58.

Annular plates 54B are fastened on the inner side surfaces of the bracket members 54 that are opposed to the arm boss 52. A pair of stopper plates 60 that retain the connection pin 59 are attached on the outer side surfaces of the bracket members 54.

The connection pin 59 is formed in a predetermined axial length that is shorter than the distance between the outer side surfaces of the bracket member 54. An axial middle part of the connection pin 59 is slidably inserted into the first bushing 55. Both axial end parts of the connection pin 59 are slidably inserted into the second bushing 57. An axial oil channel 59A and a plurality of oil channels 59B are formed inside the connection pin 59. The both ends of the oil channel 59A are communicated to a pair of oil storage chambers 62. The oil channels 59B radially extend from the oil channel 59A.

The aforementioned stopper plates 60 are tightly attached on the outer side surfaces of the bracket members 54 by a plurality of bolts 61. The pair of left and right stopper plates 60 close the bushing fit openings 54A of the bracket members 54 so that the connection pin 59 is held in a retained state in the first and second bushings 55 and 57. An annular oil groove 60A and an O-ring groove 60B are formed on the inner side surface of each stopper plate 60 that is in contact with the bracket member 54. The O-ring groove 60B is located on the outer peripheral side relative to the annular oil groove 60A.

The oil storage chambers 62 are formed between the pair of left and right stopper plates 60, and the ends of the connection pin 59. The oil storage chambers 62 store the lubricating oil that is provided between the sliding surfaces 55A and 57A of the first and second bushings 55 and 57, and the connection pin 59. An O-ring 66 is disposed between the arm boss 52 and the annular plate 54B of each bracket member 54.

The lubricating oil that is stored in the pair of oil storage chambers 62 is provided to the sliding surfaces 57A where the connection pin 59 is in slidable contact with the second bushing 57 from the both end of the connection pin 59, and is provided to the sliding surfaces 55A where the connection pin 59 is in slidable contact with the first bushing 55 through the oil channels 59A and 59B of the connection pin 59. The lubricating oil is fed through an oil feed channel 52B after an oil feed nipple 53 is detached. Thus, the lubricating oil is added to the pair of oil storage chambers 62 through the oil channels 59A and 59B.

In the bearing device disclosed in Japanese Patent Laid-open Publication TOKUKAI No. HEI 11-37138, the lubricating oil is fed through the oil feed channel 52B after the oil feed nipple 53 is detached. A part of the fed lubricating oil passes through the oil channels 59B and 59A, and is stored in the oil storage chambers 62. The stored lubricating oil is provided from the oil storage chamber 62 to the sliding surfaces 57A. Another part of the lubricating oil that is fed through the oil feed channel 52B passes through the sliding surface 55A to reach the sealing members 56.

However, the clearance between the sliding surface 55A and the connection pin 59 is narrow. In addition, this clearance is closed as a blind channel by the sealing members 56. Accordingly, the fed lubricating oil is unlikely provided to the sealing member 56 through the sliding surface 55A, and is more likely provided to the pair of oil storage chambers 62 through the oil channel 59A that is communicated to the oil feed channel 52B, and the oil channels 59B. For this reason, if the lubricating oil is added through the oil feed channel 52B at a higher pressure, the lubricating oil passes through the sliding surfaces 57A to reach the sealing members 58, and as a result leaks through the sealing members 58. Consequently, the lubricating oil leaks out from the aforementioned O-rings 66. This causes a problem.

SUMMARY OF THE INVENTION

The object of the present invention is to provide a bearing device that can uniformly distributes lubricating oil between first and second bushing sliding surfaces, and a connection pin.

A bearing device according to a first aspect of the present invention includes a pair of bracket members, a boss member, a first bushing, second bushings, a connection pin, a pair of oil storage chambers, an oil feed channel, an oil storage portion, a pair of first sealing members, a first channel, a second channel, and a pair of second sealing members. The boss member is arranged between the pair of bracket members. The first bushing is fitted into the inner peripheral surface of the boss member. The second bushings are fitted into the inner peripheral surfaces of the pair of bracket members. The connection pin is inserted into the first and second bushings slidably relative to each other, and connects the pair of bracket members and the boss member so that the pair of bracket members and the boss member can rotate relative to each other. The oil storage chambers are arranged at the both ends of the connection pin, and store lubricating oil. The oil feed channel is formed in the boss member in the radial direction. The oil storage portion is communicated to the oil feed channel, and is formed between the outer peripheral surface of the connection pin and the surface of the boss member along the peripheral direction. The pair of first sealing members are arranged at the axial outer sides of the first bushing, and seal the lubricating oil that is filled from the oil storage portion into between the first bushing and the connection pin. The first channel is formed inwardly in the radial direction from the outer peripheral surface of the connection pin. The second channel is formed along the axial direction of the connection pin, and is communicated to the first channel and the pair of oil storage chambers. The pair of second sealing members are arranged at the axial inner sides of the second bushings, and seal the lubricating oil that is filled from the oil storage chambers into between the second bushings and the connection pin.

In this construction, the lubricating oil that is added from the oil feed channel can be provided to an annular oil storage portion that is formed by the boss portion that is opposed to the connection pin outer peripheral surface and the first bushings, or an annular oil storage portion that is formed in the peripheral direction of the first bushing inner peripheral surface. Accordingly, the lubricating oil can be provided from the annular oil storage to the entire peripheral surface of the connection pin. In addition, the lubricating oil that is provided from the oil storage portion to the entire peripheral surface of the connection pin can pass through the first channel that is formed in a part of the connection pin inside and in proximity to the first sealing member, and thus can be provided to the oil storage chambers. In this case, since the lubricating oil from the oil storage portion is provided to the oil storage chambers through the first channel, the lubricating oil that is provided from the oil storage portion can be uniformly distributed between the sliding surface of the first bushing and the peripheral surface of the connection pin.

Additionally, since the first sealing members prevent leakage of the lubricating oil that is distributed between the sliding surface of the first bushing and the peripheral surface of the connection pin, the lubricating oil can uniformly lubricate between the sliding surface of the first bushing and the peripheral surface of the connection pin, and can pass through the first and second channels to the oil storage chambers. After the lubricating oil that reaches the oil storage chambers is uniformly distributed between the sliding surface of the second bushing and the connection pin, when the lubricating oil applies a desired oil pressure or more on the second sealing member, the lubricating oil leaks through the second sealing member, and flows out through between the bracket member and the boss member.

In addition, the annular oil storage portion can be formed on the inner peripheral surface of the first bushing. Additionally, the first bushing can be composed of a pair of left and right bushings so that the annular oil storage portion can be formed between the pair of left and right bushings and the boss member.

Moreover, the second channel can connect a pair of first channels to the pair of oil storage chambers, or can connect a pair of first channels to each other, and the pair of oil storage chambers to each other. In particular, in the case where the second channel communicates the pair of oil storage chambers to each other, it is possible to maintain the balance of oil pressures that are applied on the pair of oil storage chambers in the axial direction of the connection pin.

In a bearing device according to a second aspect of the present invention, in the bearing device according to the first aspect of the present invention, a plurality of channels as the first channels are formed radially from the center axis of the connection pin.

In this construction, in the case where the oil channels are uniformly spaced at an interval away from each other, it is possible to maintain the radial oil pressure balance of the connection pin. In addition, the clearances between the connection pin and the sliding surfaces of the first and second bushings can be substantially uniform on the entire peripheral surface of the connection pin.

In a bearing device according to a third aspect of the present invention, in the bearing device according to the first or second aspect of the present invention, the first sealing members have tongue portions that bent toward the oil storage portion.

In this construction, since the tongue portions of the first sealing members are constructed and arranged to bent toward the oil storage portion, the first sealing members can surely seal the lubricating oil that is provided from the oil storage portion to between the sliding surface of the first bushing and the peripheral surface of the connection pin without leakage. In addition, it is possible to communicate the oil storage portion to the oil storage chambers in a liquid tight state.

In a bearing device according to a fourth aspect of the present invention, in the bearing device according to the first or second aspect of the present invention, the second sealing members have tongue portions that bent toward a drain side where the lubricating oil flows out.

In this construction, since the second sealing members are thus constructed and arranged, it is possible to seal the lubricating oil that is provided from the oil storage chambers to between the sliding surfaces of the second bushings and the connection pin, and additionally to allow the lubricating oil to flow out through the second sealing member if the lubricating oil applies a desired oil pressure or more on the second sealing member.

In particular, in the case where the lubricating oil is added through the oil feed channel, when it is detected that the lubricating oil flows out through the second sealing member, it is possible to recognize that a desired amount of lubricating oil is added in the bearing device.

The second sealing member can be arranged between the second bushing and the connection pin, or between opposed surfaces of the second bushing and the boss member. The second sealing member can prevent leakage of the lubricating oil, and entering of dust and so on into between the connection pin and the sliding surfaces of the first and second bushings.

In addition, in the present invention, since the oil storage portion and the oil storage chambers are provided, the lubricating oil can be constantly provided to the clearances between the sliding surfaces of the first and second bushings, and the connection pin.

In a bearing device according to a fifth aspect of the present invention, in the bearing device according to the first or second aspect of the present invention, the first channels are formed in parts of the connection pin in proximity to the first sealing members on the oil storage portion side relative to the first sealing members.

In this construction, since, after the lubricating oil passes in proximity to the first sealing member, the lubricating oil passes to the first channel, it is possible to sufficiently distribute the lubricating oil to the clearance between the first bushing and the connection pin.

In a bearing device according to a sixth aspect of the present invention, in the bearing device according to the first or second aspect of the present invention, the bearing device further includes a pair of stopper plates that are arranged at the both outer ends of the bracket members.

In this construction, the oil storage chambers can be formed between the stopper plates and the both end surfaces of the connection pin, additionally, the stopper plates can prevent axial movement and detachment of the connection pin.

DETAILED DESCRIPTION OF THE INVENTION

Embodiments according to the present invention will be specifically described with reference to the drawings. Although a bearing device according to the present invention is described as a component of a hydraulic tractor shovel, the present invention is not limited to a bearing device that is used in a hydraulic tractor shovel. The present invention can be widely applied to bearing devices that have pin connection.

Any shapes and arrangements other than the shapes and arrangements described later can be used, which can solve the object of the present invention. From this point of view, the present invention is not limited to embodiments in a hydraulic tractor shovel described later, and various modifications can be made.

EMBODIMENTS

Figure 1:
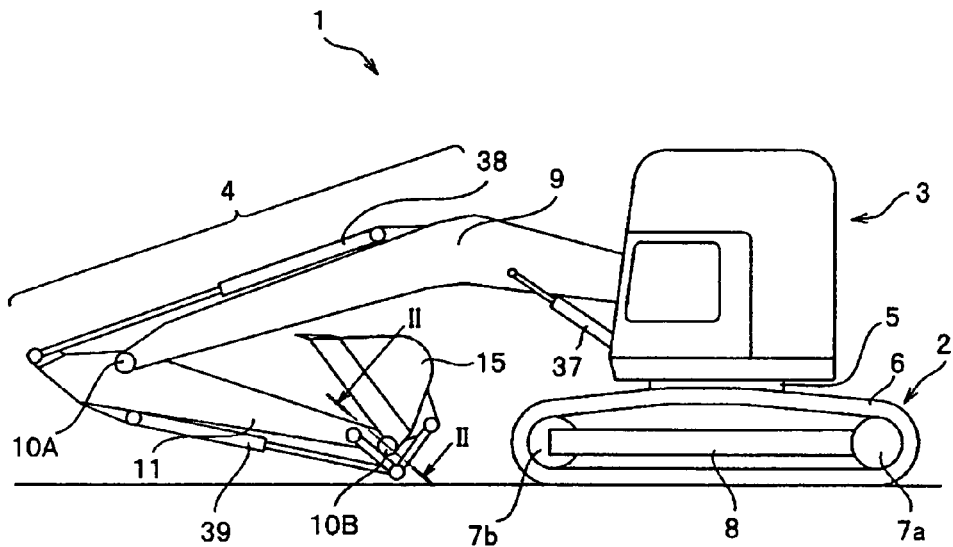
FIG. 1 Side view of a hydraulic tractor shovel that includes a bearing device according to one embodiment of the present invention (embodiment).

FIG. 1 is a side view showing a hydraulic tractor shovel according to an example of the present invention. An upper turning portion 3 that includes a working portion 4 is rotatably connected to a lower tractor portion 2 by a turning apparatus 5. Side frames 8 are arranged on the left and right sides of the lower tractor portion 2. The side frames 8 are provided with driving wheels 7a that are driven by a driving motor (not shown), and follower wheels 7b. Crawler tracks 6 are wound around between the driving wheels 7a and the follower wheels 7b.

A boom 9 is connected to the upper turning portion 3, and is pivotably supported by a bearing device (not shown). The boom 9 is pivoted by the operation of a hydraulic cylinder 37. An arm 11 is arranged at the fore end of the boom 9, and is pivotably supported by a bearing device 10A. The arm 11 is pivoted by the operation of a hydraulic cylinder 38. In addition, a bucket 15 is arranged at the fore end of the arm 11, and is pivotably supported by a bearing device 10B. The bucket 15 is pivoted by the operation of a hydraulic cylinder 39.

A bearing device that has pin connection is used for the bearing devices 10A, 10B, etc. The structure of the bearing device 10B described below is also applied to the bearing device that pivotably supports the boom 9, and the bearing device 10A that pivotably supports the arm 11 to the boom 9. For ease of explanation, the bearing device 10B that pivotably supports the bucket 15 to the arm 11 is described as an exemplary structure of these bearing devices.

Figure 2:
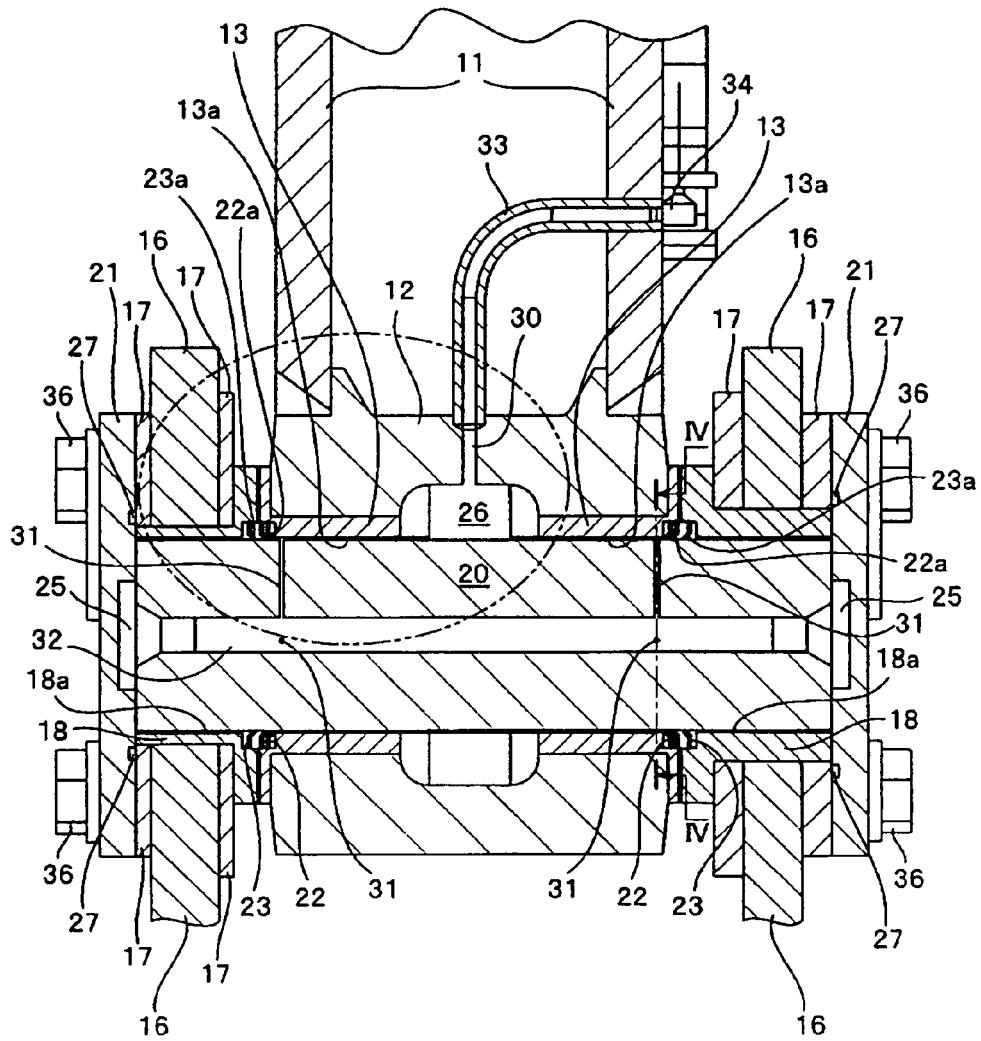
FIG. 2 Cross-sectional view taken along a line II-II in FIG. 1 (embodiment).

FIG. 2 is a cross-sectional view showing the bearing device 10B shown in FIG. 1 taken along a line II-II.

The bearing device 10B has a structure in which a connection pin 20 rotatably connects a boss member 12 that is arranged at the fore end of the arm 11 to a pair of bracket members 16 that protrude from the bucket 15. That is, the boss member 12 is arranged at the fore end of the arm 11, and this boss member 12 is interposed between the pair of bracket members 16 that protrude from the bucket 15.

First bushings 13 are fitted into bushing fit openings 12 that are formed in the axial direction of the boss member 12. A pair of the left and right first bushings 13 interpose an oil storage portion 26. The oil storage portion 26 is formed in an annular groove that are defined by the pair of left and right first bushings 13, and the inner peripheral surface of the boss member 12. The oil storage portion 26 is communicated to an oil feed channel 30 that is formed in the boss member 12.

Although the oil storage portion 26 is formed by the pair of left and right first bushings 13, and the inner peripheral surface of the boss member 12 in FIG. 2, the oil storage portion 26 can be formed on the inner peripheral surface of the first bushing 13 so that the oil storage portion 26 is communicated to the oil feed channel that is formed in the boss member 12.

A detachable nipple 34 is attached to an opening of a feed tube 33 that is communicated to the oil feed channel 30. The opening side of the feed tube 33 is located on the arm 11. After the nipple 34 is detached, and a lubricating oil feeder (not shown) is connected to the feed tube 33, thus, lubricating oil can be fed to the oil storage portion 26 through the feed tube 33 and the oil feed channel 30.

Spacers 17 are fastened on the both ends of each of the pair of left and right bracket members 16. Accordingly, the clearance between the boss member 12 and the bracket member 16 can be adjusted by the spacers 17. Although the spacers 17 are arranged on the both ends of each bracket member 16, the spacer 17 can be arranged on one end of each bracket member 16.

Stopper plates 21 are fastened on the outer side surfaces of the bracket members 16 by bolts 36 so that the bearing part is sealed. Bushing fit openings 16a are formed in the axial direction of the bracket members 16. Second bushings 18 are fitted into the bushing fit openings 16a. For example, the first bushings 13 and the second bushings can be a bushing that is formed of a metallic material, an oil-impregnated bushing, or the like. The oil-impregnated bushing is formed of a porous sintered metal with lubricating oil impregnated thereto, for example.

Figure 4:
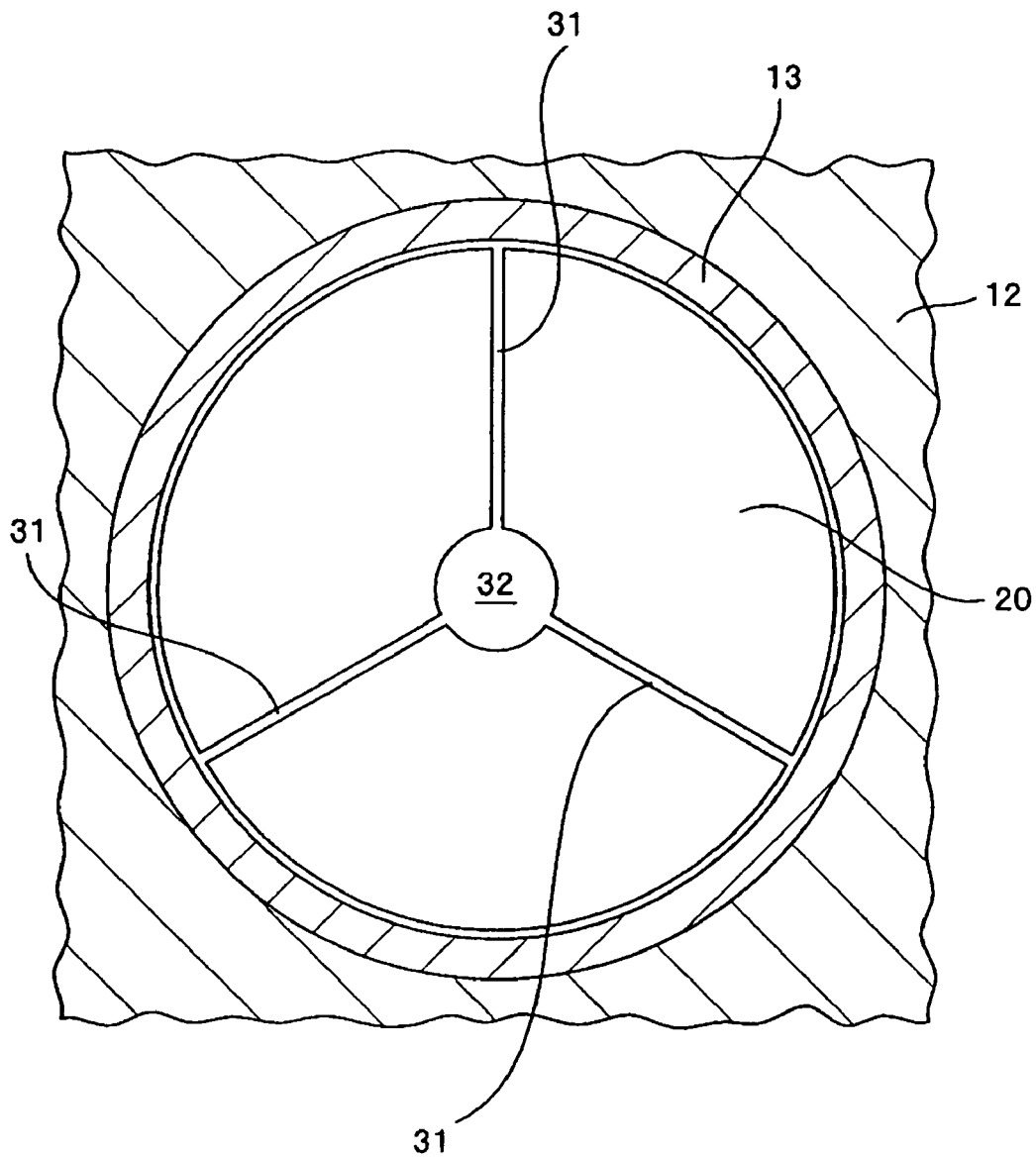
FIG. 4 Cross-sectional view taken along a line IV-IV in FIG. 2 (embodiment).
Figure 5:
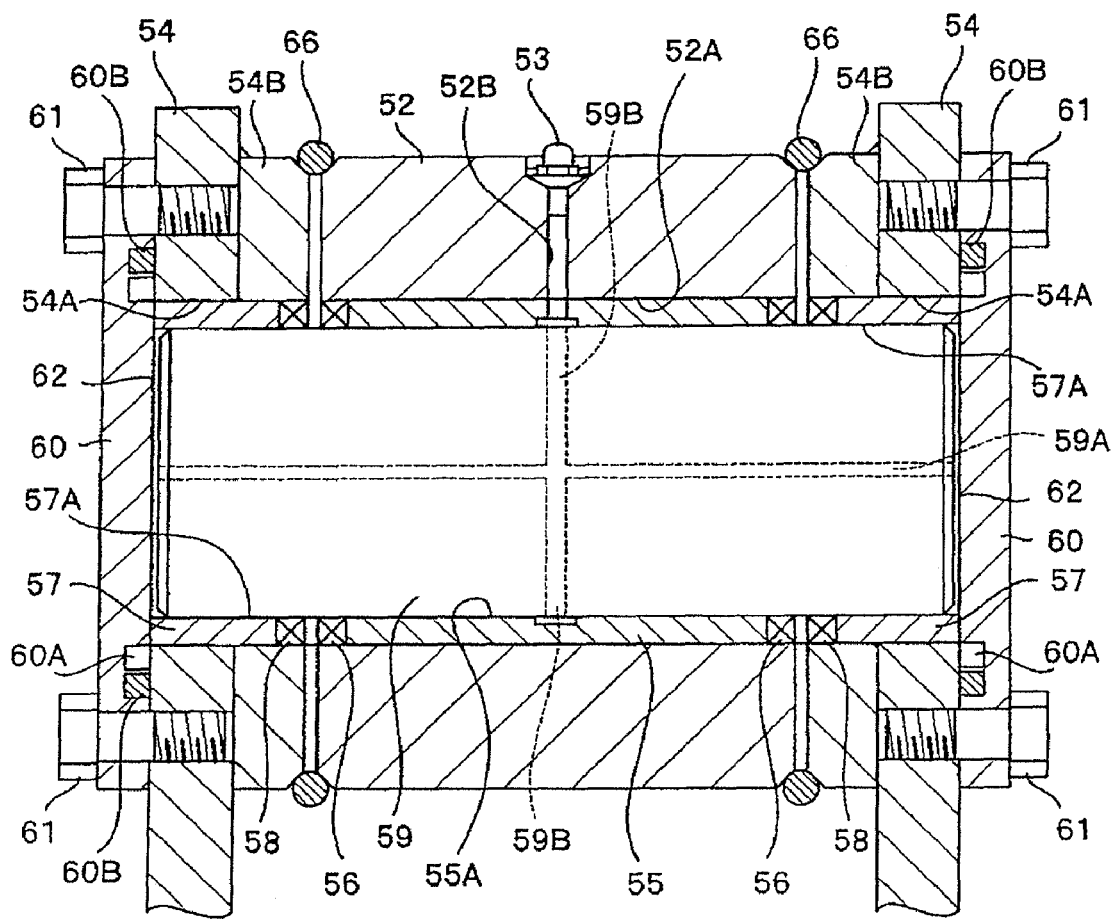
FIG. 5 Cross-sectional view of a known bearing device (known example).

The connection pin 20 passes through and is inserted into the first and second bushings 13 and 18 slidably to each other. As shown in FIG. 4 that is a cross-sectional view taken along a line IV-IV in FIG. 2, clearances are provided between the sliding surfaces 13a and 18a that are inner peripheral surfaces of the first and second bushings 13 and 18, respectively, and the outer peripheral surface of the connection pin 20. The axial movement of the connection pin 20 is restricted by the stopper plates 21. The stopper plates 21 prevent detachment of the connection pin 20. The clearances are exaggerated for purposes of illustration in FIG. 4 that shows this embodiment.

First sealing members 22 are arranged at the both ends of the first bushings 13 that are uniformly spaced away from the oil storage portion 26. The first sealing members 22 seal the space between the sliding surface 13a and the connection pin 20. Second sealing members 23 are arranged at the ends of the second bushings 18 that are located on the oil storage portion 26 sides. The second sealing member 23 seals the space between the sliding surface 18a and the connection pin 20.

Although the first seal members 22 are shown as a double sealing structure in which two tongue portions 22a of the first sealing members 22 are provided on each side in the example shown in FIG. 2, a single or multiple sealing structure in which one or multiple tongue portion(s) 22a of the first sealing members 22 is/are provided can be used. As for tongue portions 23a of the second sealing member 23, instead of a single sealing structure, a multiple sealing structure in which multiple tongue portions are provided on each side can be used. The structures of the first and second sealing members 22 and 23 are shown in detail in FIG. 3 that is a partial enlarged view of a part that is enclosed by a chain double-dashed line in FIG. 2.

The second sealing member 23 seals the space between the sliding surface 18a of the second bushing 18, and the connection pin 20. However, the second sealing member 23 is not limited to the arrangement that seals the space between the sliding surface 18a and the connection pin 20. The second sealing member can be arranged to seal the space between opposed end surfaces of the second bushing 18 and the first bushing 13.

A plurality of first channels 31 are formed in each part of the connection pin 20 in proximity to the first sealing members 22 on the oil storage portion side 26. The first channels 31 extend in the radial direction of the connection pin 20. As shown in FIG. 4 that is a cross-sectional view taken along a line IV-IV in FIG. 2, the plurality of first channels 31 are formed radially from the center axis of the connection pin 20, and are uniformly spaced at an interval away from each other. The plurality of first channels 31 are formed radially, and are uniformly spaced at an interval away from each other. In addition, the first channels 31 are composed of a pair of left and right first channel groups that are formed at the same distance from the center cross section of the connection pin 20. Accordingly, it is possible to maintain radial and axial oil pressure balance of the lubricating oil that lubricates the connection pin 20.

A second channel 32 is formed along the center of the connection pin 20 to be communicated to the pair of first channels 31 groups. In FIG. 2, the second channel 32 is communicated to the both ends of the connection pin 20 in the axial direction. However, the second channel 32 is not limited to the structure that connects the both ends of the connection pin 20. The second channel 32 can connect each end of the connection pin 20 to the first channel 31 group that is formed on this end side. In particular, in the case of the structure in which the second channel 32 is communicated to the both ends of the connection pin 20, it is possible to maintain the balance of the axial lubricating oil pressure forces that are applied on the both ends of the connection pin 20.

Oil storage chambers 25 are formed on the inner side surfaces of the stopper plates 21. These oil storage chambers 25 are communicated to the second channel 32. In addition, annular oil grooves 27 are formed on the inner side surfaces of the stopper plates 21 that contact the spacers 17 that are fastened to the bracket members 16. The annular oil grooves 27 enclose the second bushings 18.

In this illustration, although the oil grooves 27 are formed on the inner side surfaces of the stopper plates 21, O-rings and so on can be disposed on the outer peripheral side of the annual oil grooves 27 in the inner side surfaces of the stopper plates 21. Instead of the inner side surfaces of the stopper plates 21, the oil grooves 27 and the O-rings may be formed on the surfaces of the spacers 17 that are fastened to the bracket members 16.

In this structure, the oil grooves 27 and the O-rings can stop flow out of the lubricating oil from the oil storage chambers 25 through between the stopper plates 21 and the spacers 17 that are fastened to the bracket members 16.

Figure 3:
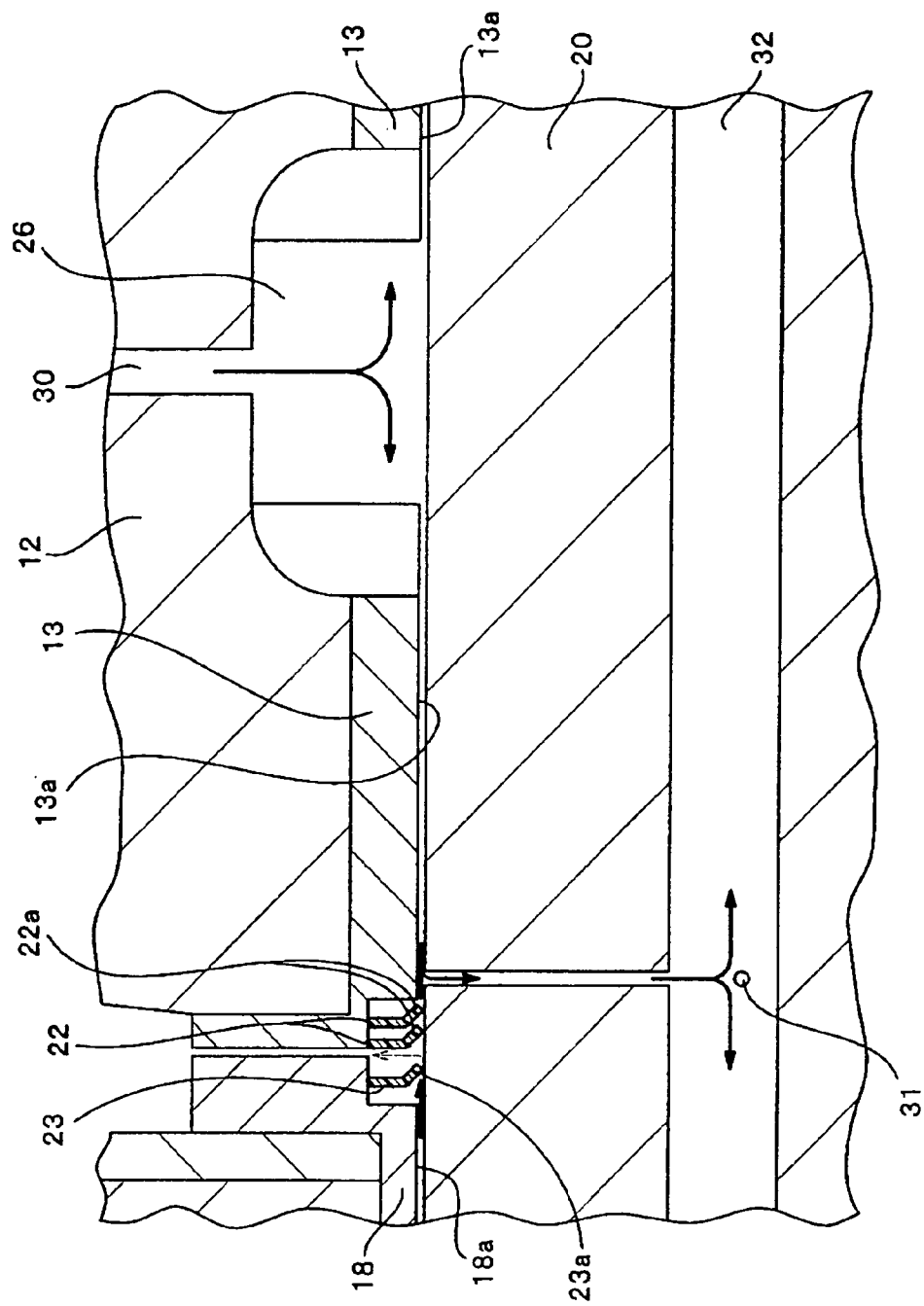
FIG. 3 Partially-enlarged view of FIG. 2 (embodiment).

As shown in FIG. 2, and in particular, in FIG. 3, each first sealing member 22 is constructed and arranged so that the tongue portion 22a of the first sealing member 22 bents toward the oil storage portion 26. In addition, each second sealing member 23 is constructed and arranged so that the tongue portion 23a of the second sealing member 23 bents toward the oil storage portion 26.

Accordingly, the first sealing members 22 can prevent flow out of the lubricating oil that is provided from the oil storage portion 26 side through the clearance between the opposed end surfaces of the first bushings 13 and the second bushings 18. As a result, it is possible to ensure that the lubricating oil passes through the first channels 31. Even in the case where the tongue portion 22a deforms due to an increased pressure of the lubricating oil that is applied to the first sealing member 22, since the tongue portion 22a deforms so that a sealing effect increased, it is possible to prevent flow out of the lubricating oil from the first sealing member 22.

In addition, in the case where the oil pressure of the lubricating oil that is provided from the oil storage chamber 25 through between the sliding surface 18a of the second bushing 18 and the outer peripheral surface of the connection pin 20 becomes the pressure that deforms the tongue portion 23a of the second seal member 23 or more, the lubricating oil can flow out through the second sealing member 23. The lubricating oil that flows out through the second sealing member 23 can flow out through the space between the opposed end surfaces of the first bushing 13 and the second bushing 18.

Since the lubricating oil can flow out through the second sealing member 23, when feeding the lubricating oil fed through the feed tube 33 after detaching the nipple 34, the user can recognize the feed completion. That is, the fed lubricating oil is uniformly distributed in the bearing device 10B, and the lubricating oil pressure in the oil storage chambers 25 becomes a desired level. If the oil pressure of the lubricating oil that is applied on the second sealing member 23 becomes the pressure that deforms the tongue portion 23a or more, the lubricating oil can flow out through the second sealing member 23. When feeding the lubricating oil, the user can recognize that the lubricating oil is sufficiently fed based on the flow out of the lubricating oil.

The following description describes the operation of the thus-constructed bearing device according to this example of the present invention.

As shown in FIG. 2, after the nipple 34 is detached, and the lubricating oil feeder (not shown) is connected to the feed tube 33, thus, lubricating oil is fed. The fed lubricating oil passes through the oil feed channel 30, and reaches the oil storage portion 26. The lubricating oil that fills the oil storage portion 26 is uniformly distributed from the annular oil storage portion 26 to the clearance between the outer peripheral surface of the connection pin 20 and the sliding surfaces 13a of the first bushings 13 as shown by arrows in FIG. 3.

The first sealing members 22 prevent flow out of the lubricating oil that is provided to the clearance between the outer peripheral surface of the connection pin 20 and the sliding surfaces 13a of the first bushings 13, thus, as shown by an arrow in FIG. 3, the lubricating oil flows through the first channels 31 that is formed in proximity to the first sealing members 22 toward the second channel 32. Since the plurality of the first channels 31 are formed radially from the connection pin 20, and are uniformly spaced at an interval away from each other, in the state where the pressure balance of the connection pin 20 in the radial direction is maintained, the lubricating oil can flow into the first channels 31.

In the state where the flows of the lubricating oil through the first channels 31 into the second channel 32 maintain the oil pressure balance between the left and right oil storage chambers 25, the lubricating oil is provided from between the stopper plates 21 and the connection pin 20 to the clearances between the sliding surfaces 18a of the second bushings 18, and the connection pin 20. When the oil pressure of the lubricating oil that is provided to the clearance between the sliding surface 18a and the connection pin 20 becomes the pressure that deforms the tongue portion of the second seal member 23, as shown by an arrow of a dotted line in FIG. 3, the lubricating oil flows out through the second sealing member 23 from the clearance between the opposed end surfaces of the first bushing and second bushings 13 and 18.

When recognizing the flow of the lubricating oil from between the end surfaces of the first and second bushings 13 and 18, the user stops feeding the lubricating oil to the feed tube 33 by using the lubricating oil feeder, and then tightly attaches the nipple 34 to the opening of the feed tube 33.

Accordingly, as shown in FIG. 1, when the hydraulic cylinder 39 is driven to pivot the bucket 15 relative to the arm 11, the connection pin 20 allows the bucket 15 to smoothly pivot relative to the arm 11. In this pivot motion, the lubricating oil can be provided from a pair of the left and right oil storage chambers 25 to between the sliding surfaces 13a of the first bushings 13, and the outer peripheral surface of the connection pin 20. In addition, the lubricating oil can be provided from the left and right oil storage chambers 25 to between the sliding surfaces 13a and the outer peripheral surfaces of the connection pin 20, and to between the sliding surfaces 18a of the second bushings 18 and the outer peripheral surfaces of the connection pin 20.

Thus, the sliding surfaces 13a and 18a can be entirely and constantly lubricated with the lubricating oil. As a result, it is possible to surely restrict wobbling between the connection pin 20 and the first and second bushings 13 and 18, and so on. Therefore, it is possible to stably keep the bearing device in an operable state for a long time.

In addition, since the first sealing members 22 prevent the flow out of the lubricating oil that is provided to between the sliding surfaces 13a of the first bushings 13, and the connection pin 20, the lubricating oil can be constantly provided between the sliding surfaces 13a and the connection pin 20.

For this reason, it is possible to surely prevent the state where the lubricating oil is not provided to the sliding surfaces of the first bushing in the bearing device that is disclosed in Japanese Patent Laid-Open Publication TOKUKAI No. HEI 11-37138.

Moreover, since the oil grooves 27 are formed on the stopper plates 21, it is possible to prevent leakage of the lubricating oil from between the stopper plates 21 and the spacers 17 that are fastened to the bracket members 16. Additionally, the annular oil grooves 27 can also prevent entering of earth, sand, water and so on from the outside into the oil storage chambers 25.

Since the stopper plates 21 prevent detachment of the connection pin 20, an additional structure that retains the connection pin 20 is not required. Therefore, it is possible to make the bearing device compact.

Other Embodiments (A)

In the foregoing embodiment, the three first channels 31 are formed on each side radially from the center axis of the connection pin 20, and are uniformly spaced at an interval in the peripheral direction away from each other. However, the present invention is not limited to this.

For example, one first channel may be formed radially from the center axis of the connection pin.

However, the structure in the foregoing embodiment is preferable. The reason is that, in the case where a plurality of first channels are uniformly spaced at an interval in the peripheral direction away from each other, it is possible to maintain the radial oil pressure balance of the connection pin with ease. In addition, the clearances between the connection pin and the sliding surfaces of the first and second bushings can be substantially equal over the entire peripheral surface of the connection pin.

(B)

In the foregoing embodiment, in the case where the axial direction of the connection pin 20 is arranged in the horizontal direction, three of the first channels 31 are left-right symmetrically formed, and three of the first channels 31 are disposed on each of the left and right sides. However, the present invention is not limited to this.

For example, the first channels may be formed on one of the left and right sides.

However, the structure in the foregoing embodiment is preferable. The reason is that, in the case where the first channels are left-right symmetrically formed, the lubricating oil can be left-right symmetrically filled.

(C)

In the foregoing embodiment, the first channels 31 are formed as holes that extend from locations in proximity to the first sealing members 22 to the second channel 32. However, the present invention is not limited to this.

For example, the first channels may be formed in locations that are close to the oil storage portion 26 rather than the first sealing members.

However, the structure in the foregoing embodiment is preferable. The reason is that, in the case where the first channels are formed in locations in proximity to the first sealing members, the lubricating oil can be sufficiently provided from the oil storage portion to between the first bushing and the outer peripheral surface of the connection pin.

INDUSTRIAL APPLICABILITY

The present invention can be effectively applied to bearing devices that are used in construction machines, and additionally to bearing devices that are used in agricultural and industrial machines, and so on.

What is claimed is:

1. A bearing device comprising:
   a pair of bracket members;
   a boss member arranged between said pair of bracket members;
   a first bushing fitted into an inner peripheral surface of said boss member, the first bushing including a pair of bushing portions axially spaced apart from each other;
   second bushings fitted into inner peripheral surfaces of said pair of bracket members;
   a connection pin inserted into said first and second bushings slidably relative to each other, and connecting said pair of bracket members and said boss member so that said pair of bracket members and said boss member can rotate relative to each other;
   a pair of oil storage chambers arranged at both ends of said connection pin, to store lubricating oil;
   an oil feed channel formed in said boss member in the radial direction;
   an oil storage portion communicated to said oil feed channel, and formed between an outer peripheral surface of said connection pin and a surface of said boss member along a peripheral direction, the oil storage portion being an annular groove defined by an axial gap formed between the bushing portions of the first bushing and the inner peripheral surface of the boss member;
   a pair of first sealing members arranged at axial outer sides of said first bushing to seal the lubricating oil that is filled through said oil storage portion in between said first bushing and said connection pin;
   a first channel formed inwardly in a radial direction from the outer peripheral surface of said connection pin;
   a second channel formed along the axial direction of said connection pin, and communicating between said first channel and at least one of said pair of oil storage chambers; and
   a pair of second sealing members arranged at axial inner sides of said second bushings to seal the lubricating oil that is filled through said oil storage chambers in between said second bushings and said connection pin.

2. The bearing device according to claim 1, wherein a plurality of channels as said first channels are formed radially from the center axis of said connection pin.

3. The bearing device according to claim 1, wherein said first sealing members have tongue portions that bend toward said oil storage portion.

4. The bearing device according to claim 1, wherein said second sealing members have tongue portions that bend toward a drain side where said lubricating oil flows out.

5. The bearing device according to claim 1, further comprising a pair of stopper plates arranged at both outer ends of said pair of bracket members.

6. The bearing device according to claim 1, wherein the second channel communicates between said pair of oil storage chambers.

7. A bearing device comprising:
   a pair of bracket members;
   a boss member arranged between said pair of bracket members;
   a first bushing fitted into an inner peripheral surface of said boss member;
   second bushings fitted into inner peripheral surfaces of said pair of bracket members;
   a connection pin inserted into said first and second bushings slidably relative to each other, and connecting said pair of bracket members and said boss member so that said pair of bracket members and said boss member can rotate relative to each other;
   a pair of oil storage chambers arranged at both ends of said connection pin, to store lubricating oil;
   an oil feed channel formed in said boss member in the radial direction;
   an oil storage portion communicated to said oil feed channel, and formed between an outer peripheral surface of said connection pin and a surface of said boss member along a peripheral direction;
   a pair of first sealing members arranged at axial outer sides of said first bushing to seal the lubricating oil that is filled through said oil storage portion in between said first bushing and said connection pin;
   a first channel formed inwardly in a radial direction from the outer peripheral surface of said connection pin;
   a second channel formed along the axial direction of said connection pin, and communicating between said first channel and at least one of said oil storage chambers; and
   a pair of second sealing members arranged at axial inner sides of said second bushings to seal the lubricating oil that is filled through said oil storage chambers in between said second bushings and said connection pin,
   said first channel being formed in a part of said connection pin in proximity to one of said first sealing members on an oil storage portion side relative to the one of said first sealing members.

8. The bearing device according to claim 7, wherein
   the first bushing includes a pair of bushing portions axially spaced apart from each other, and
   the oil storage portion is an annular groove defined by an axial gap formed between the bushing portions of the first bushing and an inner peripheral surface of the boss member.

9. The bearing device according to claim 7, wherein said first sealing members have tongue portions that bend toward said oil storage portion.

10. The bearing device according to claim 7, wherein said second sealing members have tongue portions that bend toward a drain side where said lubricating oil flows out.

11. The bearing device according to claim 7, further comprising
   a pair of stopper plates arranged at both outer ends of said pair of bracket members.

12. The bearing device according to claim 7, further comprising
   an additional first channel formed inwardly in the radial direction from the outer peripheral surface of said connection pin in a part of said connection pin in proximity to the other of said first sealing members on an oil storage portion side relative to the other of said first sealing members.

13. The bearing device according to claim 12, wherein the second channel communicates between said additional first channel and at least the other of said oil storage chambers.

14. The bearing device according to claim 13, wherein the second channel communicates between said pair of oil storage chambers.

15. The bearing device according to claim 7, wherein the second channel communicates between said pair of oil storage chambers.

* * * * *

UNITED STATES PATENT AND TRADEMARK OFFICE
CERTIFICATE OF CORRECTION

PATENT NO. : 7,748,908 B2 Page 1 of 1
APPLICATION NO. : 11/794914
DATED : July 6, 2010
INVENTOR(S) : Tatsuo Aira et al.

It is certified that error appears in the above-identified patent and that said Letters Patent is hereby corrected as shown below:

On the Title Page Item (86) should read:

-- [86] PCT No.: PCT/JP2006/300810

§371 (c)(1),
(2), (4) Date: July 9, 2007 --

Signed and Sealed this

Seventeenth Day of August, 2010

David J. Kappos
*Director of the United States Patent and Trademark Office*